Figure 1:
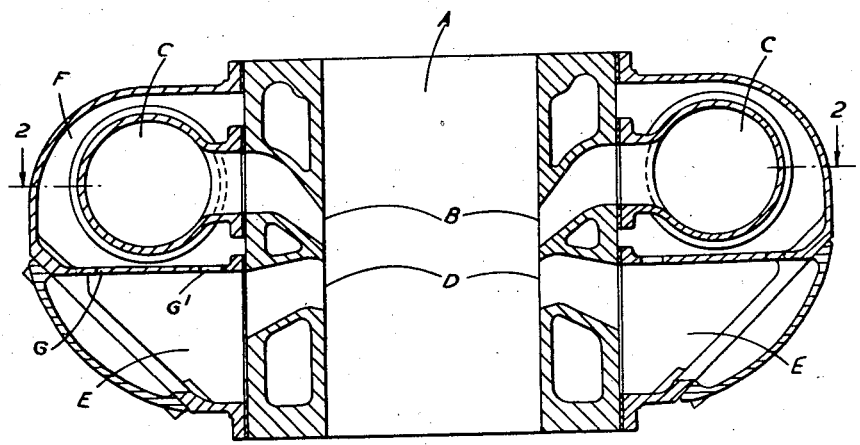

Sept. 28, 1948.  H. R. RICARDO  2,450,382

INTERNAL-COMBUSTION ENGINE

Filed Aug. 13, 1947

Inventor
Harry R. Ricardo
By
Watson, Cole, Grindle & Watson
Attorney

UNITED STATES PATENT OFFICE 2,450,382

INTERNAL-COMBUSTION ENGINE

Harry Ralph Ricardo, London, England

Application August 13, 1947, Serial No. 768,340
In Great Britain August 28, 1946

3 Claims. (Cl. 123—52)

This invention relates to internal combustion engines and more particularly to the exhaust and inlet manifolds of such engines and especially those operating on the two-stroke cycle and, for example, with supercharging and where the gases therefrom are used to drive a turbine, the conditions when running being then such that in contrast with engines running with other or more ordinary arrangements, there is a material increase in the pressures respectively in the air inlet manifold and in the exhaust gas manifold.

In such cases the mean pressure maintained in the exhaust system is substantially above that of the surrounding atmosphere, and leakage becomes a serious problem. In the case of a two-stroke cycle engine employed as the high pressure stage of a compound turbine system, the mean pressure in the exhaust system may be as much as 5 or 6 atmospheres absolute, or even more in some instances. At the same time, in the case of any engine operating on the two-stroke cycle, the pressure maintained in the induction system will exceed that in the exhaust by an amount corresponding to the pressure drop through the cylinder.

Owing to the high pressure maintained in the exhaust system it is extremely difficult to prevent leakage of exhaust gases into the engine room, and this difficulty is intensified by the high temperature of the exhaust gases and therefore of the manifolding which necessitates the use of several expansion joints, preferably an expansion joint between each individual cylinder connection.

Again, in the case when an internal combustion engine is employed as the high pressure element in a compound system, some, usually about 20% to 25%, dilution air is required in order to bring the exhaust temperature down to a figure acceptable to the turbine. This dilution air can be supplied by short-circuiting the cylinder and bleeding a small proportion of the scavenging air directly into the exhaust manifold.

According to this invention the conduit through which the exhaust gases pass after leaving the cylinders of an internal combustion engine is surrounded by a space filled with the air which is delivered to the engine cylinders for supercharging them. The space around the exhaust gas conduit or manifold may be a jacket space in communication with the air inlet or passage to the cylinders. The exhaust gas conduit may be carried through a compartment separated by a partition wall from the passage through which flows the main stream of high pressure air to the cylinders, one or more openings being provided in the partition wall so as to allow the compartment to be filled with that air. The arrangement is more especially applicable to an engine operating on the two-stroke cycle with supercharging and having the exhaust gases used to drive a turbine. These exhaust gases will then flow to the turbine at a high pressure, but the air for supercharging the cylinders will be delivered to them at a higher pressure and is thus used to fill the jacket space or compartment which is provided around the exhaust gas conduit or manifold. Some of this high pressure air may be permitted to enter the exhaust manifold and effect a dilution of the exhaust gases flowing to the turbine. In such an engine there are usually one or more expansion joints in the exhaust gas conduit and these are situated in the space which is filled with the high pressure air.

Since the mean pressure of the air within the air intake manifold is in excess of that of the exhaust, any leakage that may occur at the exhaust joints will be a leakage of air into the exhaust conduit which is not undesirable. Therefore it becomes unnecessary to adopt any elaborate methods of sealing the expansion joints which may be plain sliding fits without any glands or concertina joints.

Figure 2:
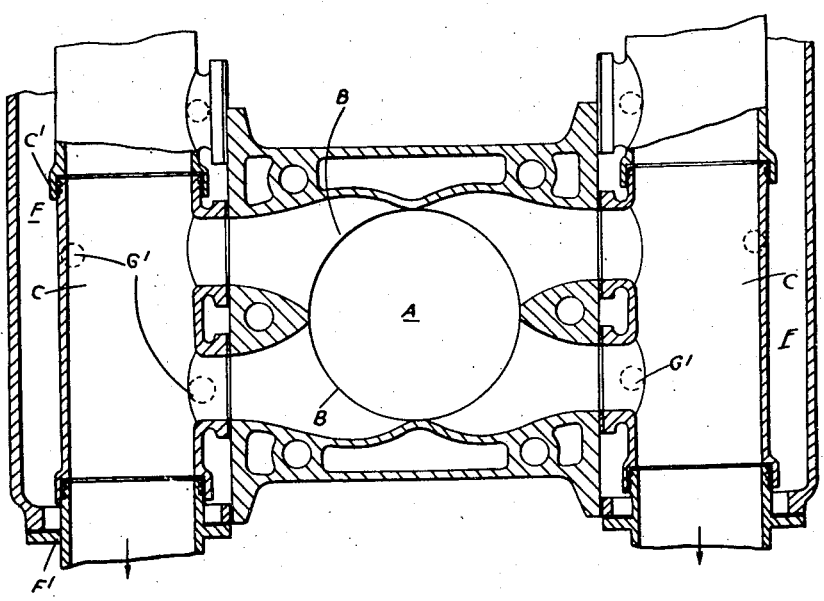

The accompanying drawings illustrate by way of example a construction which may be adopted in carrying the present invention into practice. In these drawings, Figure 1 is a vertical sectional elevation of the cylinder of an internal combustion engine embodying the present improvements, Figure 2 is a transverse section on the line 2—2 in Figure 1 looking in the direction of the arrows.

In the wall of the cylinder A are ports B through which the exhaust gases can flow to the two similar exhaust manifolds C. The air for supercharging enters the cylinder through ports D in the wall thereof from air manifolds E. The ports B and D may be controlled by the piston in the cylinder. Around each exhaust manifold C is an air space F which is separated from the air inlet manifold E by a partition G, but the air in the manifold E which is under high pressure, can enter the space F through one or more openings $G^1$ in the partition G. Thus, the exhaust manifold C is surrounded in the space F by air which is at a higher pressure than the mean pressure of the gases flowing away through the exhaust manifold.

In view of the relatively high temperature of the intake air flowing through the manifold E and as it comes from the supercharger, it is undesirable on purely mechanical grounds to raise higher the temperature of this air to any further extent. Hence, the object of the partition G which, while allowing the exhaust manifold C to be surrounded in the space F by air under high pressure, reduces the heat transference from the exhaust manifold C to the air flowing through the manifold E and into the cylinder through the ports D. The partition G shields the wall of the exhaust manifold C and prevents the air flowing through the air inlet E from flowing directly over or coming too readily into contact with the wall of the exhaust manifold C, thereby minimising the heat transference from the exhaust gases. Owing to the opening or openings $G^1$ in the partition the latter does not seal off the space F from the air in the inlet passage E but the partition functions rather as a heat deflector.

In place of one or more openings such as $G^1$ in the partition G, the latter may be so formed or arranged that some portion of the air flowing through the inlet E can pass to the side of the partition G adjacent to the exhaust manifold C and thus permit a balancing of the pressures on each side of the partition. Further, it is necessary that there should be air under the higher pressure in the space F so that some of this air may pass into the exhaust manifold C through leaky joints or through holes or passages which may be provided for the admission of dilution air into the exhaust gases. This may be convenient where these gases are used to act on a turbine. The main body of the air flowing to the cylinder A will, however, pass along the side of the partition G remote from the exhaust gas conduit C.

The exhaust gas manifold C may be freely articulated at expansion joints such as C, which may be seen in Figure 2, and its end may be carried out through the closed end $F^1$ of the jacket space F.

What I claim as my invention and desire to secure by Letters Patent is:

1. An internal combustion engine comprising in combination a cylinder, at least one passage through which flow the exhaust gases from the cylinder, at least one passage through which air for combustion enters the cylinder this air serving to supercharge the cylinder and being at a pressure in excess of the pressure mean of the exhaust gases after they leave the cylinder, a compartment through which is carried the said exhaust gas passage the said compartment providing a jacket space around the exhaust gas passage, a partition wall separating this compartment jacket space from the said passage through which air flows to the cylinder, and at least one opening in the partition wall through which air at the pressure at which it is delivered to the cylinder can flow into the said jacket space.

2. An internal combustion engine comprising in combination a plurality of cylinders, an exhaust gas manifold with at least one passage through which can flow the exhaust gases from each cylinder into said manifold, a jacket space enclosing said exhaust gas manifold, at least one passage through which air for supercharging flows to each cylinder this air being at a pressure higher than the mean pressure of the exhaust gases after leaving the cylinder, and means whereby the air under pressure flowing to the cylinders can enter and fill the said jacket space around the said exhaust gas manifold.

3. An internal combustion engine having the features set forth in claim 2 and wherein the said exhaust gas manifold is formed in sections connected by expansion joints these joints being situated where they are enclosed in the said jacket space containing high pressure air.

HARRY RALPH RICARDO.

REFERENCES CITED

The following references are of record in the file of this patent:

UNITED STATES PATENTS

| Number | Name | Date |
|---|---|---|
| 2,439,473 | Kalitinsky | Apr. 13, 1948 |